US012580736B2

(12) United States Patent
Naito

(10) Patent No.: US 12,580,736 B2
(45) Date of Patent: Mar. 17, 2026

(54) HASH VALUE COMPUTATION DEVICE, HASH VALUE COMPUTATION METHOD, AND COMPUTER READABLE MEDIUM

(71) Applicant: Mitsubishi Electric Corporation, Tokyo (JP)

(72) Inventor: Yusuke Naito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 127 days.

(21) Appl. No.: 18/437,877

(22) Filed: Feb. 9, 2024

(65) Prior Publication Data

US 2024/0187215 A1 Jun. 6, 2024

Related U.S. Application Data

(63) Continuation of application No. PCT/JP2021/036509, filed on Oct. 1, 2021.

(51) Int. Cl.
H04L 9/06 (2006.01)

(52) U.S. Cl.
CPC .......... H04L 9/0643 (2013.01); H04L 9/0618 (2013.01)

(58) Field of Classification Search
CPC ............................ H04L 9/0643; H04L 9/0618
See application file for complete search history.

(56) References Cited

U.S. PATENT DOCUMENTS 6,570,988 B1 5/2003 Venkatesan et al.
10,680,802 B2 * 6/2020 Fay ........................ H04L 9/065

2004/0078576 A1 4/2004 Geitinger
2010/0027783 A1 2/2010 Yup
2015/0215113 A1 7/2015 Naito
2015/0261965 A1 * 9/2015 Brumley ............... G06F 21/602
713/193

(Continued)

FOREIGN PATENT DOCUMENTS

DE 601 13 678 T2 7/2006
DE 600 26 868 T2 9/2006
DE 10 2008 013 785 A1 9/2008
DE 10 2019 108 095 A1 10/2020
JP 2012-68436 A 4/2012

(Continued)

OTHER PUBLICATIONS

Office Action issued in German Application No. 112021008040.7 on Mar. 12, 2025, with English translation.

(Continued)

*Primary Examiner* — Mohammed Waliullah
(74) *Attorney, Agent, or Firm* — Birch, Stewart, Kolasch & Birch, LLP

(57) ABSTRACT

A hash value computation device (10) computes a hash value H of 2n bits using a block cipher E that takes as input a key K of k bits and a plaintext block P of n bits, which is a smaller number of bits than k bits, and outputs a ciphertext of n bits. A function computation unit (22) computes a function CF that processes the block cipher E a plurality of times sequentially on an input value M* of k−n bits, an input value S[1] of n bits, and an input value S[2] of n bits so as to compute an output value S'[1] of n bits and an output value S'[2] of n bits. A hash value computation unit (23) computes the hash value H from the output value S'[1] and the output value S'[2].

12 Claims, 12 Drawing Sheets

(56)                     References Cited

U.S. PATENT DOCUMENTS

| | | | | |
|---|---|---|---|---|
| 2019/0372752 A1* | 12/2019 | Fay | .......................... | H04L 9/065 |
| 2020/0313886 A1 | 10/2020 | Poeppelmann | | |

FOREIGN PATENT DOCUMENTS

| | | | | |
|---|---|---|---|---|
| JP | 5528281 B2 | 6/2014 | | |
| WO | WO-2014046024 A1 * | 3/2014 | ................ | G09C 1/00 |
| WO | WO-2018154623 A1 * | 8/2018 | ........... | H04L 9/3236 |

OTHER PUBLICATIONS

Wikipedia, "Block cipher", as edited Sep. 12, 2021, pp. 1-15.
Wikipedia, "Cryptographic hash function", edited Sep. 23, 2021, pp. 1-14.

Wikipedia, "Merkle-Damgard construction", as edited Jun. 9, 2021, pp. 1-5.
Beierle et al., "The SKINNY Family of Block Ciphers and Its Low-Latency Variant Mantis", Crypto 2016. LNCS 9815. Springer. p. 123-153.
Hirose, "Some Plausible Constructions of Double-Block-Length Hash Functions", FSE 2006. LNCS 4047. Springer. p. 210-225.
International Search Report (PCT/ISA/210) issued in PCT/JP2021/036509 mailed on Nov. 22; 2021.
Naito, "Optimally Indifferentiable Double-Block-Length Hashing Without Post-processing and with Support for Longer Key Than Single Block." LATINCRYPT 2019. p. 65-85.
National Institute of Standards and Technology (NIST). Announcing the "Advanced Encryption Standard (AES)", Federal Information Processing Standards Publication 197, Nov. 26, 2001, Total pp. 51.

* cited by examiner

START

S21 — COMPUTE FUNCTION IT TO COMPUTE HASH VALUE H

S22 — INTERCHANGE FIRST n BITS H[1] AND REMAINING n BITS H[2] OF HASH VALUE H, AND ADD BIT STRING SO AS TO BE k BITS

S23 — COMPUTE PERMUTATION FUNCTION π₆ AND SET FIRST k-n BITS AS VALUE V[1] AND REMAINING n BITS AS VALUE V[2]

S24 — (S'[1], S'[2]) = CF(V[1], V[2], IV[3])

S25 — COMPUTE HASH VALUE H FROM S'[1] AND S'[2]

END

HASH VALUE COMPUTATION DEVICE, HASH VALUE COMPUTATION METHOD, AND COMPUTER READABLE MEDIUM

CROSS-REFERENCE TO RELATED APPLICATION

This application is a Continuation of PCT International Application No. PCT/JP2021/036509, filed on Oct. 1, 2021, which is hereby expressly incorporated by reference into the present application.

TECHNICAL FIELD

The present disclosure relates to a technique to compute a hash value.

BACKGROUND ART

A hash function is a function that takes as input data of an arbitrary length and outputs data of a fixed length. A hash function is used as a component to construct cryptographic algorithms such as public key encryption and tampering detection algorithms.

As a method for designing a hash function, there is a method using a block cipher such as AES. AES is described in Non-Patent Literature 1. AES is an abbreviation for Advanced Encryption Standard.

A block cipher E is a function that takes as input a plaintext block P of n bits and a key K of k bits and outputs a ciphertext block C of n bits. If the key K is fixed, the block cipher E is a permutation of n bits. If the key K is changed, the block cipher E is a different permutation of n bits.

As typified by AES, it is common to set n=128 and k=128, 192, or 256.

Security properties of a hash function include unidirectionality, second-preimage resistance, collision resistance, and pseudorandom oracle. Cryptographic algorithms such as public-key encryption and tampering detection algorithms are designed on the assumption that a hash function satisfies these security properties. Then, the hash function is designed to satisfy these security properties.

That a hash function H satisfies unidirectionality means that if an output value y of the hash function His given, it is computationally difficult to find an input value M such that y=H(M).

That the hash function H satisfies second-preimage resistance means that if an input value M of the hash function His given, it is computationally difficult to find an input value M' different from the input value M such that H(M)=H(M').

That the hash function H satisfies collision resistance means that it is computationally difficult to find two different input values M and M' such that H(M)=H(M').

That the hash function H satisfies pseudorandom oracle means that if a block cipher E that is a component of the hash function H is idealized, it is indistinguishable from a random oracle that is an ideal hash function H. The idealized block cipher E is one randomly selected from all block ciphers with a key length k and a plaintext block length n. A more detailed definition is described in Non-Patent Literature 3.

If a hash function satisfies pseudorandom oracle, the hash function satisfies unidirectionality, second-preimage resistance, and collision resistance. If a hash function satisfies collision resistance, the hash function satisfies second-preimage resistance and collision resistance.

The output length of a hash function is generally 256 bits. However, the size n of a block cipher is generally 128 bits.

Therefore, when a hash function is designed using a block cipher, the hash function is designed to be twice the output length of the block cipher. Such a hash function is called a double-block-length hash function.

One of design benchmarks of a hash function is a memory size. The memory size is one for recording intermediate values when the hash function is computed. The smaller the memory size, the smaller a RAM size in the case of software, and the smaller a circuit size in the case of hardware. RAM is an abbreviation for random access memory.

If a block cipher with a plaintext block of n bits and a key of k bits is used, a memory of n+k bits is always required. Therefore, the minimum memory size of a double-block-length hash function is n+k bits.

The security level of a double-block-length hash function is the value of log 2 of the amount of computation necessary to break the security of the hash function. The optimum security level of a double-block-length hash function is n bits based on the birthday attack.

Non-Patent Literature 2 presents a double-block-length hash function. This double-block-length hash function uses a block cipher that satisfies a relation k>n, and satisfies collision resistance. This double-block-length hash function has a security level of n bits and a memory size of 3n+k bits.

This double-block-length hash function uses a double-block-length compression function with fixed input and output lengths such that the input length is n+k bits and the output length is 2n bits. This double-block-length hash function has a construction to repeatedly process the double-block length compression function. In this double-block-length compression function, block ciphers used to compute an output 1 and an output 2 are processed in parallel. Therefore, this double-block-length compression function requires a memory to record the output 1 and a memory for computing the output 2, requiring a total of 3n+k bits.

Patent Literature 1 presents a double-block-length hash function. This double-block-length hash function uses a block cipher that satisfies a relation k≥2n, and satisfies pseudorandom oracle. This double-block-length hash function has a security level of n bits and a memory size of 2n+k bits.

This double-block-length hash function uses a construction such that a feed forward operation is excluded from the construction in Non-Patent Literature 2. Therefore, this double-block-length hash function also uses the construction in which block ciphers are processed in parallel, as with the double-block-length hash function of Non-Patent Literature 2.

Non-Patent Literature 3 presents a double-block-length hash function. This double-block-length hash function uses a block cipher that satisfies a relation k>n, and satisfies pseudorandom oracle. This double-block-length hash function has a security level of n bits and a memory size of 3n+k bits.

This double-block-length hash function uses the construction of Non-Patent Literature 2. Therefore, this double-block-length hash function also uses the construction in which block ciphers are processed in parallel, as with the double-block-length hash function of Non-Patent Literature 2.

CITATION LIST

Patent Literature

Patent Literature 1: JP 2012-068436 A

Non-Patent Literature

Non-Patent Literature 1: National Institute of Standards and Technology (NIST). Announcing the Advanced Encryption Standard (AES). FIPS PUB 197, 2001.
Non-Patent Literature 2: Shoichi Hirose. Some Plausible Constructions of Double-Block-Length Hash Functions. FSE 2006. LNCS 4047. Springer. p. 210-225
Non-Patent Literature 3: Yusuke Naito. Optimally Indifferentiable Double-Block-Length Hashing Without Post-processing and with Support for Longer Key Than Single Block. LATINCRYPT 2019. p. 65-85

SUMMARY OF INVENTION

Technical Problem

Existing double-block-length hash functions require a memory size of 2n+k bits or larger. There is no existing double-block-length hash function with a minimum memory size of n+k bits and a security level of n bits.

An object of the present disclosure is to make it possible to construct a double-block-length hash function whose required memory size is small.

Solution to Problem

A hash value computation device according to the present disclosure computes a hash value H of 2n bits using a block cipher E that takes as input a key K of k bits and a plaintext block P of n bits, which is a smaller number of bits than k bits, and outputs a ciphertext of n bits, and the hash value computation device includes a function computation unit to compute a function CF that processes the block cipher E a plurality of times sequentially on an input value M* of k−n bits, an input value S[1] of n bits, and an input value S[2] of n bits so as to compute an output value S'[1] of n bits and an output value S'[2] of n bits; and a hash value computation unit to compute the hash value H from the output value S'[1] and the output value S'[2] computed by the function computation unit.

Advantageous Effects of Invention

In the present disclosure, a block cipher E is processed a plurality of times sequentially on an input value M*, an input value S[1], and an input value S[2] so as to compute an output value S'[1] and an output value S'[2]. That is, the block cipher E is processed sequentially, instead of being processed in parallel. As a result, a required memory size can be made small.

DESCRIPTION OF EMBODIMENTS

Embodiment 1

In Embodiment 1, a hash value computation device 10 that realizes a double-block-length hash function will be described.

Description of Configuration

Figure 1:
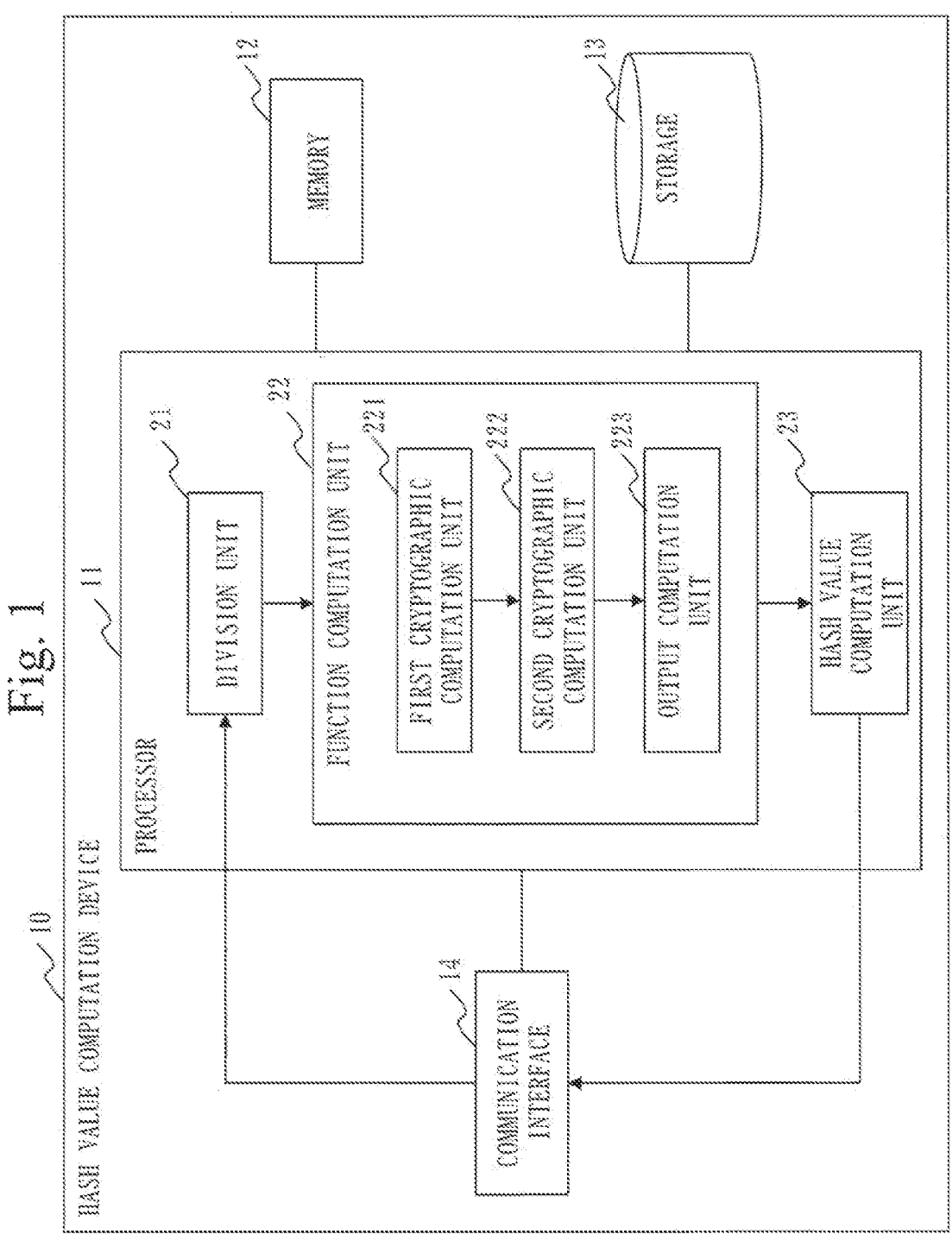
FIG. 1 is a configuration diagram of a hash value computation device 10 according to Embodiment 1.

Referring to FIG. 1, a configuration of the hash value computation device 10 according to Embodiment 1 will be described.

The hash value computation device 10 is a computer.

The hash value computation device 10 includes hardware of a processor 11, a memory 12, a storage 13, and a communication interface 14. The processor 11 is connected with other hardware components through signal lines, and controls these other hardware components.

The processor 11 is an IC that performs processing. IC is an abbreviation for integrated circuit. Specific examples of the processor 11 are a CPU, a DSP, and a GPU. CPU is an abbreviation for central processing unit. DSP is an abbreviation for digital signal processor. GPU is an abbreviation for graphics processing unit.

The memory 12 is a storage device to temporarily store data. Specific examples of the memory 12 are an SRAM and a DRAM. SRAM is an abbreviation for static random access memory. DRAM is an abbreviation for dynamic random access memory.

The storage 13 is a storage device to store data. A specific example of the storage 13 is an HDD. HDD is an abbreviation for hard disk drive. Alternatively, the storage 13 may be a portable recording medium such as an SD (registered trademark) memory card, CompactFlash (registered trademark), a NAND flash, a flexible disk, an optical disc, a compact disc, a Blu-ray (registered trademark) disc, and a DVD. SD is an abbreviation for Secure Digital. DVD is an abbreviation for digital versatile disk.

The communication interface 14 is an interface for communicating with external devices. Specific examples of the communication interface 14 are an Ethernet (registered trademark) port, a USB port, and an HDMI (registered trademark) port. USB is an abbreviation for Universal Serial Bus. HDMI is an abbreviation for High-Definition Multimedia Interface.

The hash value computation device 10 includes, as functional components, a division unit 21, a function computation unit 22, and a hash value computation unit 23. The function computation unit 22 includes a first cryptographic computation unit 221, a second cryptographic computation unit 222, and an output computation unit 223. The functions of the functional components of the hash value computation device 10 are realized by software.

The storage 13 stores programs that realize the functions of the functional components of the hash value computation device 10. These programs are read into the memory 12 by the processor 11 and executed by the processor 11. This realizes the functions of the functional components of the hash value computation device 10.

In FIG. 1, only one processor 11 is illustrated. However, there may be a plurality of processors 11, and the plurality of processors 11 may cooperate to execute the programs that realize the functions.

Description of Operation

Referring to FIGS. 2 to 6, operation of the hash value computation device 10 according to Embodiment 1 will be described.

A procedure for the operation of the hash value computation device 10 according to Embodiment 1 is equivalent to a hash value computation method according to Embodiment 1. A program that realizes the operation of the hash value computation device 10 according to Embodiment 1 is equivalent to a hash value computation program according to Embodiment 1.

The hash value computation device 10 according to Embodiment 1 realizes a double-block-length hash function. Therefore, a hash function according to Embodiment 1 computes a hash value H of 2n bits using a block cipher E that takes as input a key K of k bits and a plaintext block P of n bits, which is a smaller number of bits than k bits, and outputs a ciphertext of n bits.

Figure 2:
FIG. 2 is a diagram describing notation of a block cipher E according to Embodiment 1.

In the following description, the block cipher E will be denoted as illustrated in FIG. 2. An output value of the block cipher E that takes as input the key K and the plaintext block P will be denoted as E(K, P). That is, C=E(K, P). In Embodiment 1, the block cipher E is used as a function that takes as input a value of k+n bits and outputs a value of n bits.

Figure 3:
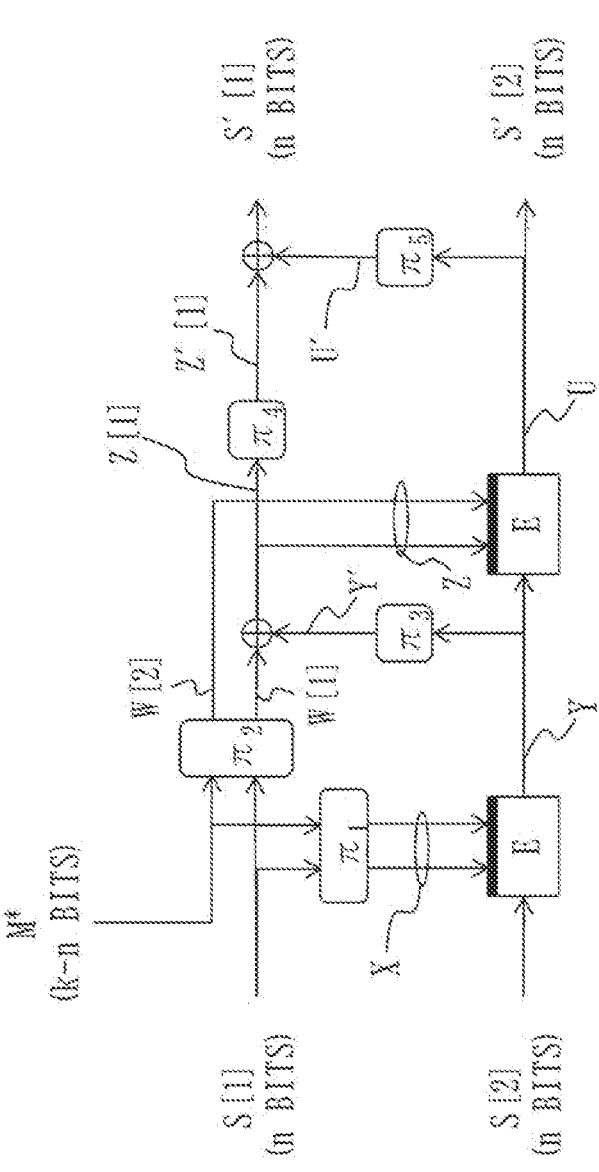
FIG. 3 is a diagram describing a function CF according to Embodiment 1.
Figure 4:
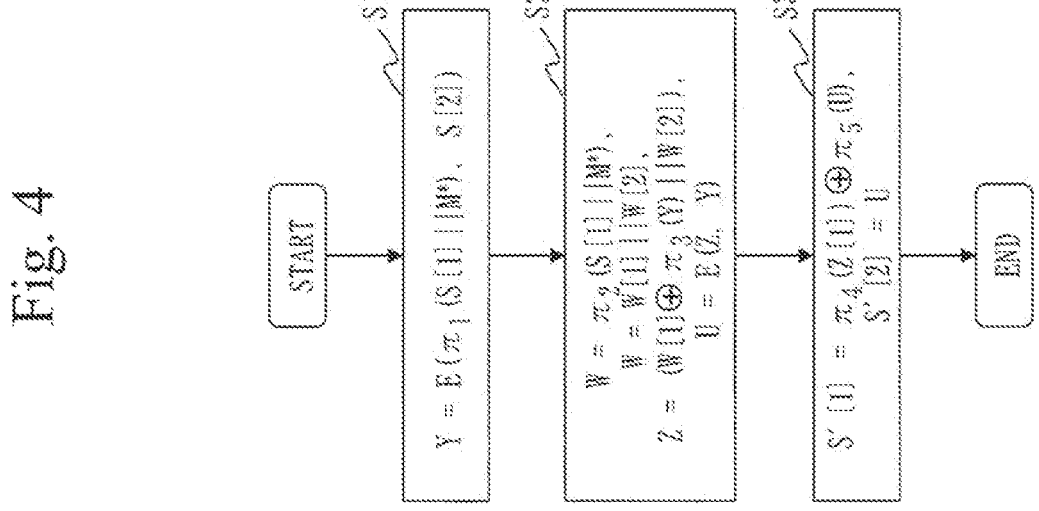
FIG. 4 is a flowchart illustrating processes of the function CF according to Embodiment 1.

Referring to FIGS. 3 and 4, a function CF according to Embodiment 1 will be described.

The hash value computation device 10 uses the function CF to construct the hash function. The function CF is computed by the function computation unit 22.

The function CF processes the block cipher E a plurality of times sequentially on an input value M* of k−n bits, an input value S[1] of n bits, and an input value S[2] of n bits, so as to compute an output value S'[1] of n bits and an output value S'[2] of n bits.

That is, the function CF performs computation on the input values of n+k bits (M*, S[1], S[2]) to compute the values of 2n bits (S'[1], S'[2]). Note that |M*|=k−n and |S[1]|=|S[2]|=|S'[1]|=|S'[2]|=n. The output values of the function CF for the input values (M*, S[1], S[2]) are denoted as CF(M*, S[1], S[2]). That is, (S'[1], S'[2])=CF(M*, S[1], S[2]).

Each of $\pi_1$ and $\pi_2$ is a permutation function of k bits. Each of $\pi_3$, $\pi_4$, and $\pi_5$ is a permutation function of n bits. Each of these permutation functions may be an identify map, which is a permutation function that directly outputs an input value. In the function CF, an exclusive OR may be addition or subtraction.

(Step S1: First Cryptographic Computation Process)

The first cryptographic computation unit 221 computes the block cipher E using as input the input value S[2] and a value X of k bits computed from the input value M* and the input value S[1], so as to compute a value Y of n bits.

The value X is a value output by the permutation function $\pi_1$ using as input a bit string obtained from the input value S[1] and the input value M*. Here, the bit string obtained from the input value S[1] and the input value M* is a bit string obtained by concatenating the input value M* and the input value S[1] in this order. The bit string obtained from the input value S[1] and the input value M* may be a bit string obtained by concatenating the input value M* and the input value S[1] in this order. The bit string obtained from the input value S[1] and the input value M* may be a bit string obtained by arranging the bit string of the input value S[1] and the bit string of the input value M* in a determined order.

That is, the first cryptographic computation unit 221 computes Formula 1, where "∥" is an operator that represents bit concatenation.

$$Y=E(\pi_1(S[1]\|M^*), S[2]) \qquad \text{[Formula 1]}$$

(Step S2: Second Cryptographic Computation Process)

The second cryptographic computation unit 222 computes the block cipher E using as input the value Y and a value Z of k bits computed from the input value S[1], the input value M*, and the value Y, so as to compute a value U of n bits.

The value Z is a value obtained by concatenating an exclusive OR of a value W[1] of n bits and a value Y' with a value W[2] of k−n bits, where the value Y' is output by the permutation function $\pi_3$ using as input the value Y. The value W[1] and the value W[2] are bit strings extracted from a value W output by the permutation function $\pi_2$ using as input a bit string obtained from the input value S[1] and the input value M*. Here, the first n bits of the value W are set as the value W[1] and the remaining k−n bits are set as the value W[2]. The bit string obtained from the input value S[1] and the input value M* is the same bit string as that in the process of step S1. That is, the second cryptographic computation unit 222 computes Formula 2.

$$W=\pi_2(S[1]\|M^*), \ W=W[1]\|W[2], \ Z=(W[1]\oplus\pi_3(Y)\|W[2]), \ U=E(Z,Y) \qquad \text{[Formula 2]}$$

(Step S3: Output Computation Process)

The output computation unit 223 computes a value S'[1] and a value S'[2] using at least one of the value Y and the value U.

Specifically, the output computation unit 223 computes, as the value S'[1], an exclusive OR of a value Z'[1] output by the permutation function $\pi_4$ using as input a value Z[1] of n bits, which is a bit string extracted from the value Z, and a value U' output by the permutation function $\pi_5$ using as input the value U. The output computation unit 223 sets the value U directly as the value S'[2].

That is, the output computation unit 223 computes Formula 3.

$$S'[1]=\pi_4(Z[1])\oplus\pi_5(U), \ S'[2]=U \qquad \text{[Formula 3]}$$

Figure 5:
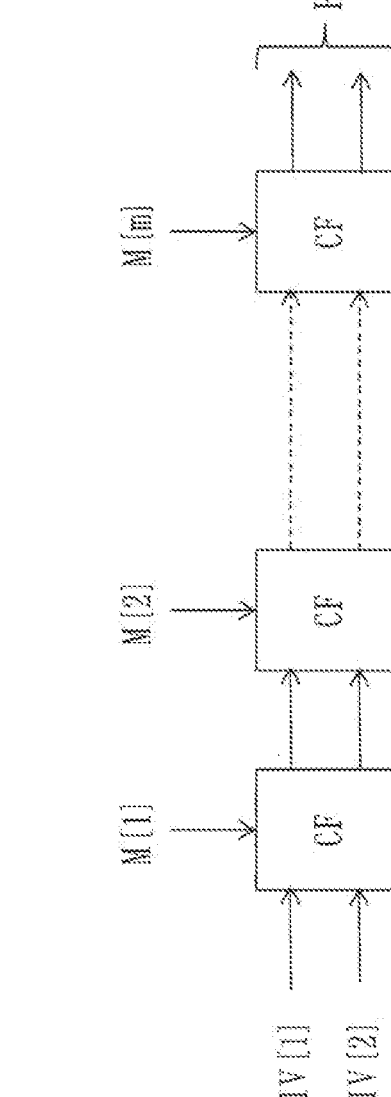
FIG. 5 is a diagram describing a hash function according to Embodiment 1.
Figure 6:
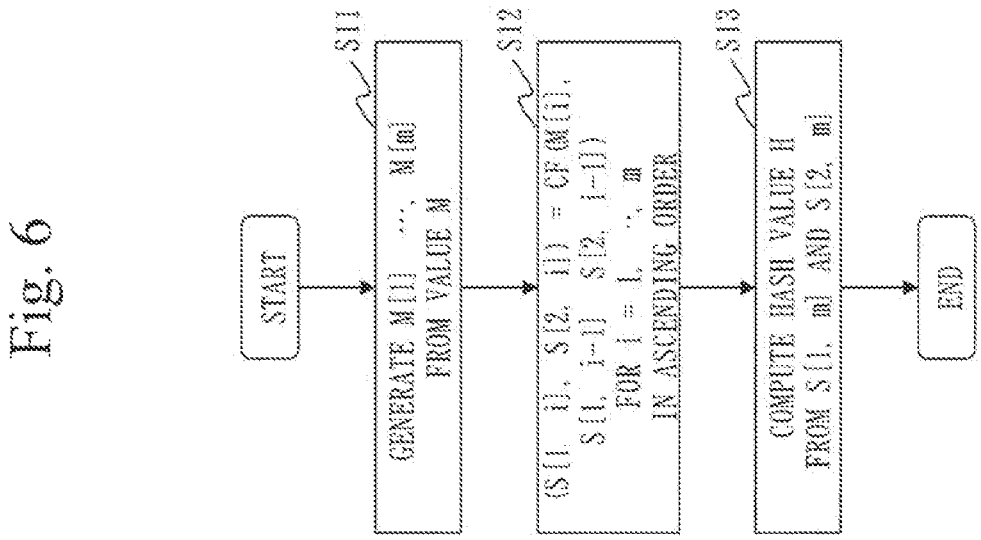
FIG. 6 is a flowchart illustrating processes of the hash function according to Embodiment 1.

Referring to FIGS. 5 and 6, the hash function according to Embodiment 1 will be described.

In the hash function according to Embodiment 1, an input value M to the hash function is processed by repeatedly executing the function CF. Specifically, the function computation unit 22 computes the function CF sequentially using, as a value M*, each of a value M[1], . . . , a value M[m] obtained from the value M. Then, the hash value computation unit 23 computes a hash value H for the input value M from a value S'[1] and a value S'[2] output from the function CF that is computed last.

(Step S11: Division Process)

If a value M for which a hash value is computed is not a multiple of k–n bits, the division unit 21 generates a value M' by padding the input value M with a fixed bit string so as to make the input value M a multiple of k–n bits. As a specific example, the division unit 21 concatenates 1 to the end of the value M and further concatenates a bit string of zeros until the length is a multiple of k–n bits. If the value M for which the hash value is computed is a multiple of k–n bits, the division unit 21 sets the value M directly as the value M'.

The division unit 21 divides the value M' from the beginning at every k–n bits to generate a value M[1], . . . , a value M[m], where m is an integer of 1 or greater.

(Step S12: Function Computation Process)

The function computation unit 22 computes the function CF using a value M[i] as the input value M*, a value S[1, i–1] as the input value S[1], and a value S[2, i–1] as the input value S[2], for each integer i of i=1, . . . , m in ascending order. By this, the function computation unit 22 computes the output value S'[1] as a value S[1, i] and the output value S'[2] as a value S[2, i]. Note that a value S[1, 0] is a fixed value IV[1] and a value S[2, 0] is a fixed value IV[2].

(Step S13: Hash Value Computation Process)

The hash value computation unit 23 computes the hash value H from a value S[1, m] and a value [2, m]. As a specific example, the hash value computation unit 23 computes the hash value H by concatenating the value S[1, m] and the value S[2, m].

Effects of Embodiment 1

As described above, the hash value computation device 10 according to Embodiment 1 processes the block cipher E twice sequentially in the function CF. That is, the block cipher E is processed sequentially, instead of being processed in parallel. Therefore, there is no need to simultaneously store information necessary for computing each block cipher E.

As a result, the hash value computation device 10 according to Embodiment 1 can realize a hash function whose required memory size is small. Specifically, a hash function whose required memory size is n+k bits can be realized.

The hash value computation device 10 according to Embodiment 1 can realize a hash function that satisfies collision resistance and has a security level of n bits. For example, by using AES or SKINNY as the block cipher E, it is possible to realize a hash function that satisfies collision resistance and has a security level of 128 bits.

AES is described in Non-Patent Literature 1. SKINNY is described in the following literature: "Christof Beierle, Jeremy Jean, Stefan Kolbl, Gregor Leander, Amir Moradi, Thomas Peyrin, Yu Sasaki, Pascal Sasdrich, Siang Meng Sim. The SKINNY Family of Block Ciphers and Its Low-Latency Variant MANTIS. CRYPTO 2016. LNCS 9815. Springer. p123-153".

Other Configurations

Variation 1

In Embodiment 1, the functional components are realized by software. As Variation 1, however, the functional components may be realized by hardware. With regard to this Variation 1, differences from Embodiment 1 will be described.

Figure 7:
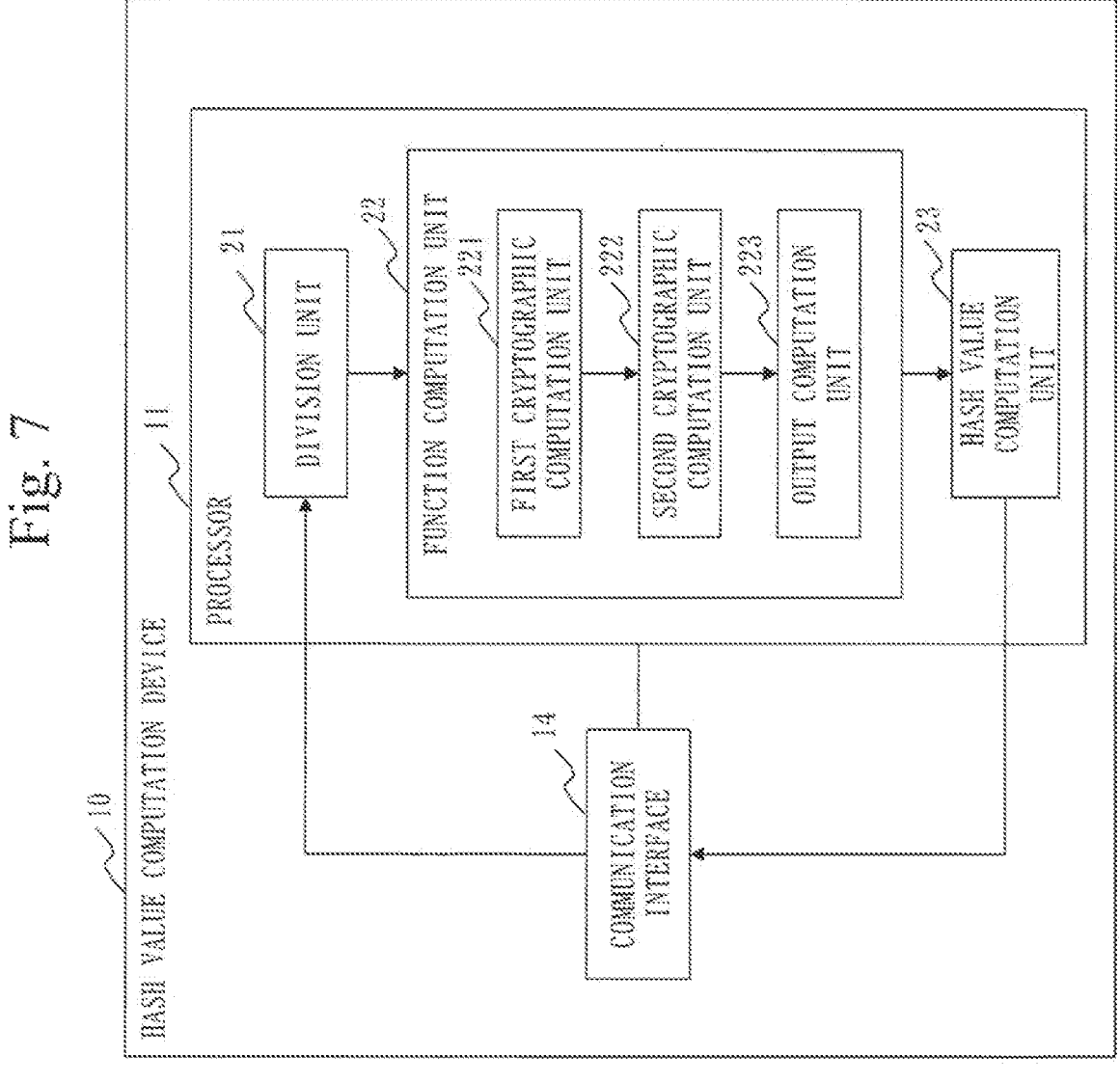
FIG. 7 is a configuration diagram of the hash value computation device 10 according to Variation 1.

Referring to FIG. 7, a configuration of the hash value computation device 10 according to Variation 1 will be described.

When the functional components are realized by hardware, the hash value computation device 10 includes an electronic circuit 15 in place of the processor 11, the memory 12, and the storage 13. The electronic circuit 15 is a dedicated circuit that realizes the functions of the functional components, the memory 12, and the storage 13.

The electronic circuit 15 is assumed to be a single circuit, a composite circuit, a programmed processor, a parallel-programmed processor, a logic IC, a gate array (GA), an application specific integrated circuit (ASIC), or a field-programmable gate array (FPGA).

The functional components may be realized by one electronic circuit 15, or the functional components may be distributed among and realized by a plurality of electronic circuits 15.

For example, each of the functional components may be realized by a separate electronic circuit 15. Alternatively, separately from the electronic circuit 15 to realize the functional components, an electronic circuit 15 to realize common processing may be provided. The common processing includes computation of the block cipher E, computation of the permutation functions, computation of exclusive ORs, and bit concatenation. In this case, the electronic circuit 15 that realizes the functional components uses the common processing to perform processing.

Variation 2

As Variation 2, some of the functional components may be realized by hardware, and the rest of the functional components may be realized by software.

Each of the processor 11, the memory 12, the storage 13, and the electronic circuit 15 is referred to as processing circuitry. That is, the functions of the functional components are realized by the processing circuitry.

Embodiment 2

Embodiment 2 differs from Embodiment 1 in the construction of a hash function. In Embodiment 2, this difference will be described and description of the same aspects will be omitted.

Description of Configuration

Figure 8:
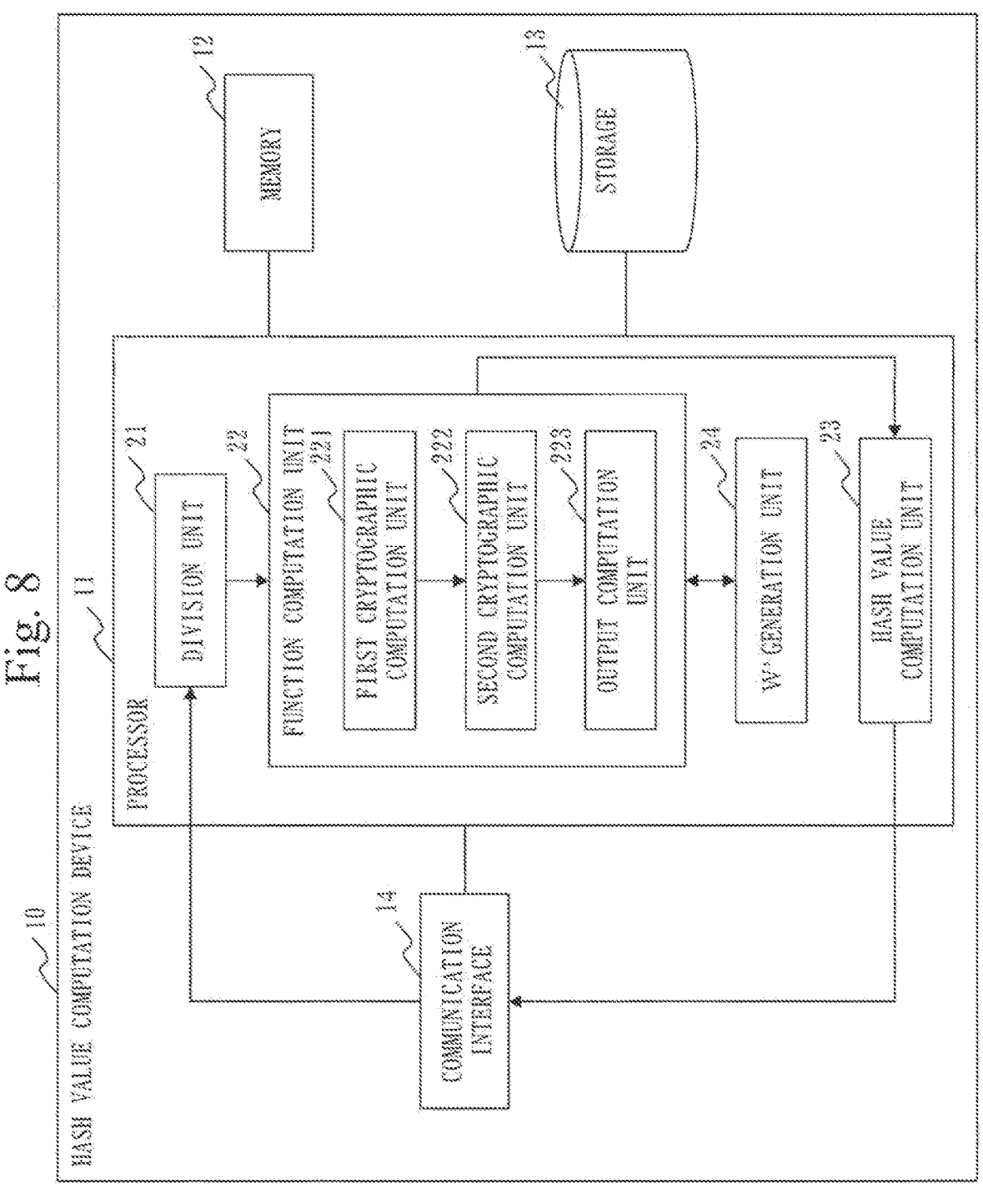
FIG. 8 is a configuration diagram of the hash value computation device 10 according to Embodiment 2.

Referring to FIG. 8, a configuration of the hash value computation device 10 according to Embodiment 2 will be described.

The hash value computation device 10 differs from the hash value computation device 10 illustrated in FIG. 1 in that a W' generation unit 24 is included as a functional component. The function of the W' generation unit 24 is realized by software or hardware, as with the other functional components.

Description of Operation

Figure 9:
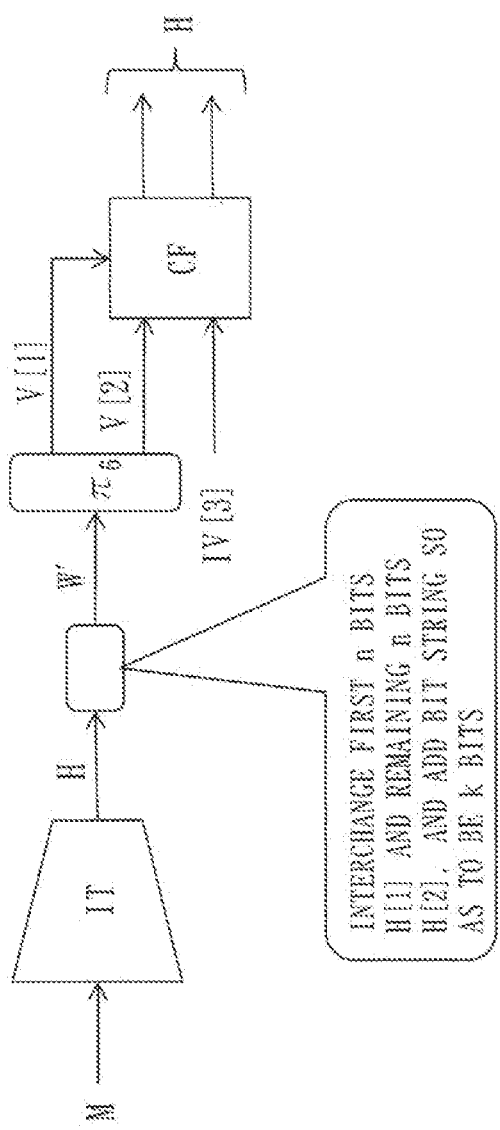
FIG. 9 is a diagram describing a hash function according to Embodiment 2.
Figure 10:
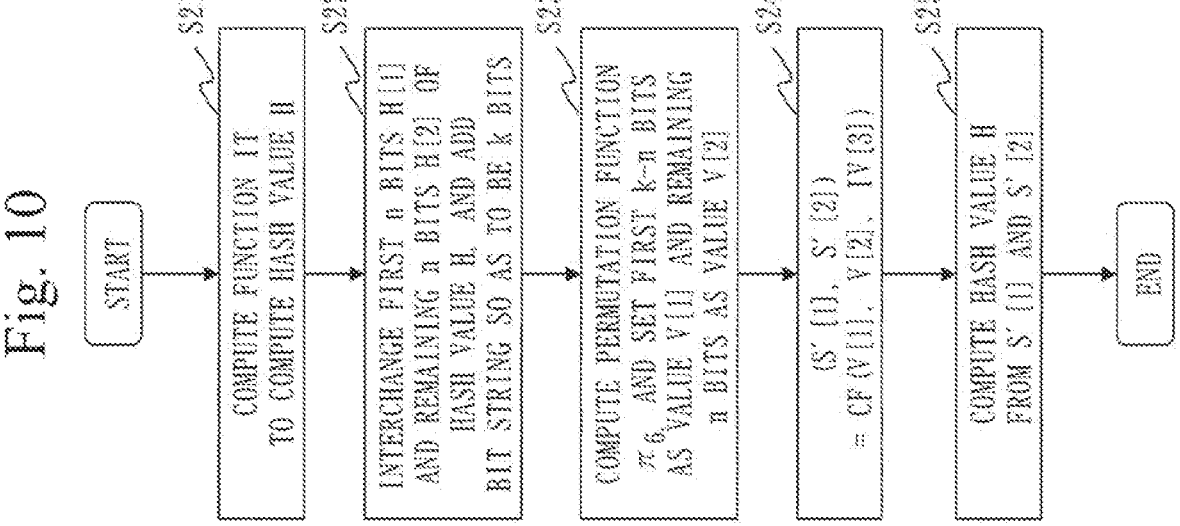
FIG. 10 is a flowchart illustrating processes of the hash function according to Embodiment 2.

Referring to FIGS. 9 and 10, a hash function according to Embodiment 2 will be described.

In the hash function according to Embodiment 2, a hash value H' is computed using the hash function described in Embodiment 1 as a function IT. Specifically, the hash value H' is computed from a hash value H output by the function IT.

In Embodiment 2, k≥ 2n.

(Step S21: Function IT Computation Process)

The hash value H is computed by the processes of step S11 to step S13 of FIG. 6.

(Step S22: W' Generation Process)

The W' generation unit 24 generates a value W' of k bits from the hash value H computed in step S21.

Specifically, the W' generation unit 24 sets the first n bits of the hash value H of 2n bits as a value H[1] and sets the remaining n bits as a value H[2]. The W' generation unit 24 interchanges the value H[1] and the value H[2]. That is, the W' generation unit 24 sets H=H[2]∥H[1]. Then, the W' generation unit 24 adds a fixed bit string of k−2n bits to the interchanged hash value H to generate the value W' of k bits. As a specific example, the W' generation unit 24 adds a bit string of zeros of k−2n bits to the front of the interchanged hash value H.

(Step S23: Input Computation Process)

The function computation unit 22 generates a value V[1] of k−n bits and a value V[2] of n bits from a value V output by a permutation function 16 using as input the value W'. The permutation function no is a permutation function of k bits. The permutation function 16 may be an identify map. As a specific example, the function computation unit 22 sets the first k−n bits of the value V as the value V[1] and sets the remaining n bits as the value V[2].

(Step S24: Function Re-Computation Process)

The function computation unit 22 computes the function CF using the value V[1] as the value M*, the value V[2] as the input value S[1], and a fixed value IV[3] of n bits as the value S[2]. By this, the function computation unit 22 computes an output value S'[1] and an output value S'[2].

(Step S25: Hash Value Computation Process)

The hash value computation unit 23 computes the hash value H from the value S'[1] and the value S'[2] computed in step S24. As a specific example, the hash value computation unit 23 computes the hash value H by concatenating the value S'[1] and the value S'[2].

Effects of Embodiment 2

As described above, the hash value computation device 10 according to Embodiment 2 realizes a hash function using the hash function according to Embodiment 1 as a component.

The hash function realized by the hash value computation device 10 according to Embodiment 2 requires a memory size of n+k bits. The hash value computation device 10 according to Embodiment 2 can realize a hash function that satisfies random oracle and has a security level of n bits. For example, by using AES or SKINNY as the block cipher E, it is possible to realize a hash function that satisfies random oracle and has a security level of 128 bits.

Embodiment 3

Embodiment 3 differs from Embodiments 1 and 2 in the construction of a hash function. In Embodiment 3, this difference will be described and description of the same aspects will be omitted.

Description of Configuration

The hash value computation device 10 according to Embodiment 3 has the same configuration as the hash value computation device 10 according to Embodiment 1 illustrated in FIG. 1.

Description of Operation

Figure 11:
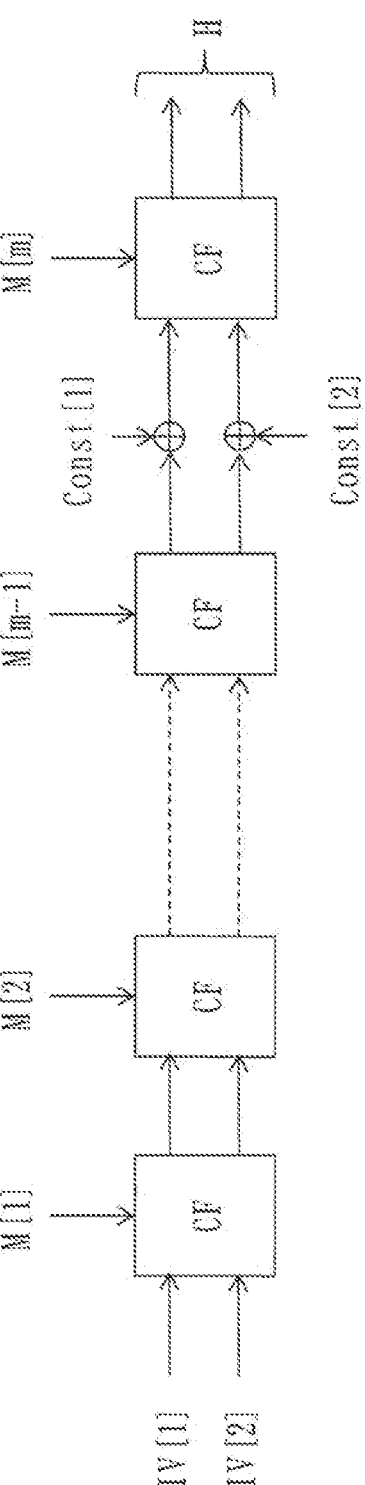
FIG. 11 is a diagram describing a hash function according to Embodiment 3.
Figure 12:
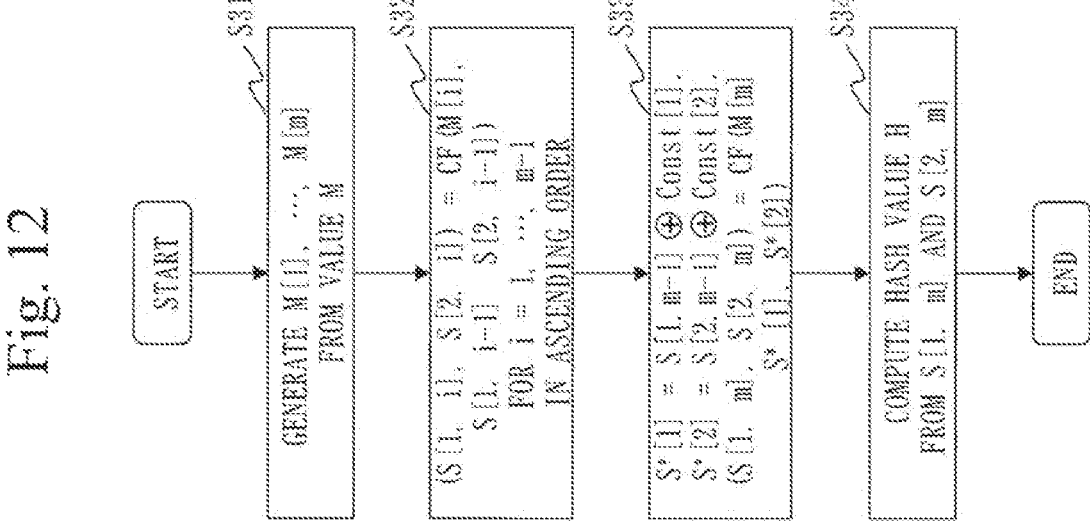
FIG. 12 is a flowchart illustrating processes of the hash function according to Embodiment 3.

Referring to FIGS. 11 and 12, a hash function according to Embodiment 3 will be described.

In the hash function according to Embodiment 3, the input value M to the hash function is processed by repeatedly executing the function CF, as in the hash function according to Embodiment 1. However, an exclusive OR with each of a fixed value Const[1] and a fixed value Const[2] is computed in an intermediate step.

The process of step S31 is the same as the process of step S11 of FIG. 6. The process of step S34 is the same as the process of step S13 of FIG. 6.

(Step S32: First Function Computation Process)

The function computation unit 22 computes the function CF using a value M[i] as the input value M*, a value S[1, i−1] as the input value S[1], and a value S[2, i−1] as the input value S[2], for each integer i of i=1, . . . , m−1 in ascending order. By this, the function computation unit 22 computes the output value S'[1] as a value S[1, i] and the output value S'[2] as a value S[2, i]. Note that a value S[1, 0] is a fixed value IV[1] and a value S[2, 0] is a fixed value IV[2].

If m=1, the process of step S32 is skipped.

(Step S33: Second Function Computation Process)

The function computation unit 22 computes an exclusive OR of a value S[1, m−1] and the fixed value Const[1] and sets it as a value S*[1]. The function computation unit 22 also computes an exclusive OR of a value S[2, m−1] and the fixed value Const[2] and sets it as a value S*[2]. The fixed value Const[1] and the fixed value Const[2] are non-zero values.

Then, the function computation unit 22 computes the function CF using a value M[m] as the input value M*, the value S*[1] as the input value S[1], and the value S*[2] as the input value S[2]. By this, the function computation unit 22 computes the output value S'[1] as a value S[1, m] and the output value S'[2] as a value S[2, m].

Note that the function computation unit 22 uses, as each of the fixed value Const[1] and the fixed value Const[2], a different value in each case of a case where the value M is a multiple of k−n bits and a case where the value M is not a multiple of k−n bits. That is, two sets of the fixed value Const[1] and the fixed value Const[2] are prepared and one of the sets is used as appropriate.

Effects of Embodiment 3

As described above, the hash value computation device 10 according to Embodiment 3 realizes a hash function using the function CF, as in Embodiment 1. The hash function realized by the hash value computation device 10 according to Embodiment 3 requires a memory size of n+k bits. The hash value computation device 10 according to Embodiment 3 can realize a hash function that satisfies random oracle and has a security level of n bits. For example, by using AES or SKINNY as the block cipher E, it is possible to realize a hash function that satisfies random oracle and has a security level of 128 bits.

"Unit" in the above description may be interpreted as "circuit", "step", "procedure", "process", or "processing circuitry".

The embodiments and variations of the present disclosure have been described above. Two or more of these embodiments and variations may be implemented in combination. Alternatively, one of them or two or more of them may be partially implemented. The present disclosure is not limited to the above embodiments and variations, and various modifications can be made as necessary.

REFERENCE SIGNS LIST

10: hash value computation device, 11: processor, 12: memory, 13: storage, 14: communication interface, 15: electronic circuit, 21: division unit, 22: function computation unit, 23: hash value computation unit, 221: first cryptographic computation unit, 222: second cryptographic computation unit, 223: output computation unit, 24: W' generation unit.

The invention claimed is:

1. A hash value computation device to compute a hash value H of 2n bits using a block cipher E that takes as input a key K of k bits and a plaintext block P of n bits, which is a smaller number of bits than k bits, and outputs a ciphertext of n bits, the hash value computation device comprising processing circuitry to:

compute a function CF that processes the block cipher E a plurality of times sequentially on an input value M* of k−n bits, an input value S[1] of n bits, and an input value S[2] of n bits so as to compute an output value S'[1] of n bits and an output value S'[2] of n bits, compute the hash value H from the output value S'[1] and the output value S'[2] that have been computed, compute the block cipher E using as input the input value S[2] and a value X of k bits computed from the input value M* and the input value S[1], so as to compute a value Y of n bits, compute the block cipher E using as input the value Y and a value Z of k bits computed from the input value S[1], the input value M*, and the value Y, so as to compute a value U of n bits, compute the value S'[1] and the value S'[2] using at least one of the value Y and the value U, and output the ciphertext of n bits, wherein the processing circuitry includes a processor and a memory, the processor is configured to store intermediate values while computing in the memory, and a required memory size in the memory for outputting the ciphertext of n bits is k+n bits.

2. The hash value computation device according to claim 1, wherein the value X is a value output by a permutation function mi using as input a bit string obtained from the input value S[1] and the input value M*, wherein the value Z is a value obtained by concatenating an exclusive OR of a value W[1] of n bits and a value Y' with a value W[2] of k−n bits, the value W[1] being a bit string extracted from a value W output by a permutation function $\pi_2$ using as input a bit string obtained from the input value S[1] and the input value M*, the value Y' being a value output by a permutation function $\pi_3$ using as input the value Y, the value W[2] being a value that remains after the value W[1] is excluded from the value W, wherein the value S'[1] is an exclusive OR of a value Z'[1] and a value U', the value Z'[1] being a value output by a permutation function $\pi_4$ using as input a value Z [1] of n bits, which is a bit string extracted from the value Z, the value U' being a value output by a permutation function $\pi_5$ using as input the value U, and wherein the value S'[2] is the value U.

3. A hash value computation device to compute a hash value H of 2n bits using a block cipher E that takes as input a key K of k bits and a plaintext block P of n bits, which is a smaller number of bits than k bits, and outputs a ciphertext of n bits, the hash value computation device comprising processing circuitry configured to:

compute a function CF that processes the block cipher E a plurality of times sequentially on an input value M* of k−n bits, an input value S[1] of n bits, and an input value S[2] of n bits so as to compute an output value S'[1] of n bits and an output value S'[2] of n bits, compute the hash value H from the output value S'[1] and the output value S'[2] that have been computed, and divide a value M' at every k−n bits to generate a value M[1], . . . , a value M[m], the value M' being a value obtained by padding a value M for which a hash value is computed so as to make the value M a multiple of k−n bits when the value M is not a multiple of k−n bits, wherein the processing circuitry sets a value S[1, 0] as a fixed value IV[1] and sets a value S[2, 0] as a fixed value IV[2], and computes the output value S'[1] as a value S[1, i] and the output value S'[2] as a value S[2, i] by the function CF using a value M[i] as the input value M*, a value [1, i-1] as the input value S[1], and a value S[2, i-1] as the input value S[2], for each integer i of i=1, . . . , m in ascending order, computes the hash value H from a value S[1, m] and a value S[2, m], and wherein the processing circuitry includes a processor and a memory, the processor is configured to store intermediate values while computing in the memory, and a required memory size in the memory for outputting the ciphertext of n bits is k+n bits.

4. The hash value computation device according to claim 3, wherein the processing circuitry generates a value W' of k bits by adding k-2n bits to a value obtained by interchanging first n bits and remaining n bits of the computed hash value H, where k≥2n, computes the output value S'[1] as a value H'[1] and the output value S'[2] as a value H'[2] by the function CF using a value V[1] of k−n bits as the input value M*, a value V[2] as the input value S[1], and a fixed value IV[3] as the input value S[2], the value V[1] being a bit string extracted from a value V output by a permutation function $\pi_6$ using as input the generated value W', the value V[2] being a bit string that remains after the value V[1] is excluded from the value V, and computes a hash value H' from the value H'[1] and the value H'[2].

5. A hash value computation device to compute a hash value H of 2n bits using a block cipher E that takes as input a key K of k bits and a plaintext block P of n bits, which is a smaller number of bits than k bits, and outputs a ciphertext of n bits, the hash value computation device comprising processing circuitry configured to:

compute a function CF that processes the block cipher E a plurality of times sequentially on an input value M* of k−n bits, an input value S[1] of n bits, and an input value S[2] of n bits so as to compute an output value S'[1] of n bits and an output value S'[2] of n bits, compute the hash value H from the output value S'[1] and the output value S'[2] that have been computed, and divide a value M' at every k–n bits to generate a value M[1], . . . , a value M[m], the value M' being a value obtained by padding a value M for which a hash value is computed so as to make the value M a multiple of k–n bits when the value M is not a multiple of k–n bits, wherein the processing circuitry sets a value S[1, 0] as a fixed value IV[1] and sets a value S[2, 0] as a fixed value IV[2], and computes the output value S'[1] as a value S[1, i] and the output value S'[2] as a value S[2, i] by the function CF using a value M[i] as the input value M*, a value S[1, i-1] as the input value S[1], and a value S[2, i-1] as the input value S[2], for each integer i of i=1, . . . , m–1 in ascending order, computes the output value S'[1] as a value S[1, m] and the output value S'[2] as a value S[2, m] by the function CF using a value M[m] as the input value M*, an exclusive OR of a value S[1, m-1] and a non-zero fixed value Const [1] as the input value S[1], and an exclusive OR of a value S[2, m-1] and a non-zero fixed value Const [2] as the input value S[2], computes the hash value H from the value S[1, m] and the value [2, m], and output the ciphertext of n bits, wherein the processing circuitry includes a processor and a memory, the processor is configured to store intermediate values while computing in the memory, and a required memory size in the memory for outputting the ciphertext of n bits is k+n bits.

6. The hash value computation device according to claim 5, wherein the processing circuitry uses a different value as each of the fixed value Const [1] and the fixed value Const [2] in each case of a case where the value M is a multiple of k–n bits and a case where the value M is not a multiple of k–n bits.

7. A hash value computation method for computing a hash value H of 2n bits using a block cipher E that takes as input a key K of k bits and a plaintext block P of n bits, which is a smaller number of bits than k bits, and outputs a ciphertext of n bits, the hash value computation method comprising:

computing a function CF that processes the block cipher E a plurality of times sequentially on an input value M* of k–n bits, an input value S[1] of n bits, and an input value S[2] of n bits so as to compute an output value S'[1] of n bits and an output value S'[2] of n bits;

computing the hash value H from the output value S'[1] and the output value S'[2];

computing the block cipher E using as input the input value S[2] and a value X of k bits computed from the input value M* and the input value S[1], so as to compute a value Y of n bits;

computing the block cipher E using as input the value Y and a value Z of k bits computed from the input value S[1], the input value M*, and the value Y, so as to compute a value U of n bits;

computing the value S'[1] and the value S'[2] using at least one of the value Y and the value U; and outputting the ciphertext of n bits, wherein the hash value computation method is performed by processing circuitry including a processor and a memory, the processor stores intermediate values while computing in the memory, and a required memory size in the memory for the hash value computation method is k+n bits.

8. A hash value computation method for computing a hash value H of 2n bits using a block cipher E that takes as input a key K of k bits and a plaintext block P of n bits, which is a smaller number of bits than k bits, and outputs a ciphertext of n bits, the hash value computation method comprising:

computing a function CF that processes the block cipher E a plurality of times sequentially on an input value M* of k–n bits, an input value S[1] of n bits, and an input value S[2] of n bits so as to compute an output value S'[1] of n bits and an output value S'[2] of n bits;

computing the hash value H from the output value S'[1] and the output value S'[2];

dividing a value M' at every k–n bits to generate a value M[1], . . . , a value M[m], the value M' being a value obtained by padding a value M for which a hash value is computed so as to make the value M a multiple of k–n bits when the value M is not a multiple of k–n bits;

setting a value S[1, 0] as a fixed value IV[1] and setting a value S[2, 0] as a fixed value IV[2], and computing the output value S'[1] as a value S[1, i] and the output value S'[2] as a value S[2, i] by the function CF using a value M[i] as the input value M*, a value [1, i-1] as the input value S[1], and a value S[2, i-1] as the input value S[2], for each integer i of i=1, . . . , m in ascending order;

computing the hash value H from a value S[1, m] and a value S[2, m]; and outputting the ciphertext of n bits, wherein the hash value computation method is performed by processing circuitry including a processor and a memory, the processor stores intermediate values while computing in the memory, and a required memory size in the memory for the hash value computation method is k+n bits.

9. A hash value computation method for computing a hash value H of 2n bits using a block cipher E that takes as input a key K of k bits and a plaintext block P of n bits, which is a smaller number of bits than k bits, and outputs a ciphertext of n bits, the hash value computation method comprising:

computing a function CF that processes the block cipher E a plurality of times sequentially on an input value M* of k–n bits, an input value S[1] of n bits, and an input value S[2] of n bits so as to compute an output value S'[1] of n bits and an output value S'[2] of n bits;

computing the hash value H from the output value S'[1] and the output value S'[2];

dividing a value M' at every k–n bits to generate a value M[1], . . . , a value M[m], the value M' being a value obtained by padding a value M for which a hash value is computed so as to make the value M a multiple of k–n bits when the value M is not a multiple of k–n bits;

setting a value S[1, 0] as a fixed value IV[1] and setting a value S[2, 0] as a fixed value IV[2], and computing the output value S'[1] as a value S[1, i] and the output value S'[2] as a value S[2, i] by the function CF using a value M[i] as the input value M*, a value S[1, i-1] as the input value S[1], and a value S[2, i-1] as the input value S[2], for each integer i of i=1, . . . , m–1 in ascending order;

computing the output value S'[1] as a value S[1, m] and the output value S'[2] as a value S[2, m] by the function CF using a value M[m] as the input value M*, an exclusive OR of a value S[1, m-1] and a non-zero fixed value Const [1] as the input value S[1], and an exclusive OR of a value S[2, m-1] and a non-zero fixed value Const [2] as the input value S[2];

computing the hash value H from the value S[1, m] and the value [2, m]; and outputting the ciphertext of n bits, wherein the hash value computation method is performed by processing circuitry including a processor and a memory, the processor stores intermediate values while computing in the memory, and a required memory size in the memory for the hash value computation method is k+n bits.

10. A non-transitory computer readable medium storing a hash value computation program to compute a hash value H of 2n bits using a block cipher E that takes as input a key K of k bits and a plaintext block P of n bits, which is a smaller number of bits than k bits, and outputs a ciphertext of n bits, the hash value computation program causing a computer to function as a hash value computation device to perform:

a function computation process of computing a function CF that processes the block cipher E a plurality of times sequentially on an input value M* of k−n bits, an input value S[1] of n bits, and an input value S[2] of n bits so as to compute an output value S'[1] of n bits and an output value S'[2] of n bits; and a hash value computation process of computing the hash value H from the output value S'[1] and the output value S'[2] computed by the function computation process, wherein the function computation process performs a first cryptographic computation process of computing the block cipher E using as input the input value S[2] and a value X of k bits computed from the input value M* and the input value S[1], so as to compute a value Y of n bits, a second cryptographic computation process of computing the block cipher E using as input the value Y and a value Z of k bits computed from the input value S[1], the input value M*, and the value Y, so as to compute a value U of n bits, an output computation process of computing the value S'[1] and the value S'[2] using at least one of the value Y and the value U, and outputting the ciphertext of n bits, wherein the hash value computation program causes a processor of the of the hash value computation device to store intermediate values while computing in a memory of the hash value computation device, and a required memory size in the memory for outputting the ciphertext is k+n bits.

11. A non-transitory computer readable medium storing a hash value computation program to compute a hash value H of 2n bits using a block cipher E that takes as input a key K of k bits and a plaintext block P of n bits, which is a smaller number of bits than k bits, and outputs a ciphertext of n bits, the hash value computation program causing a computer to function as a hash value computation device to perform:

a function computation process of computing a function CF that processes the block cipher E a plurality of times sequentially on an input value M* of k−n bits, an input value S[1] of n bits, and an input value S[2] of n bits so as to compute an output value S'[1] of n bits and an output value S'[2] of n bits;

a hash value computation process of computing the hash value H from the output value S'[1] and the output value S'[2] computed by the function computation process;

a division process of dividing a value M' at every k−n bits to generate a value M[1], . . . , a value M[m], the value M' being a value obtained by padding a value M for which a hash value is computed so as to make the value M a multiple of k−n bits when the value M is not a multiple of k−n bits; and outputting the ciphertext of n bits, wherein the function computation process sets a value S[1, 0] as a fixed value IV[1] and sets a value S[2, 0] as a fixed value IV[2], and computes the output value S'[1] as a value S[1, i] and the output value S'[2] as a value S[2, i] by the function CF using a value M[i] as the input value M*, a value [1, i-1] as the input value S[1], and a value S[2, i-1] as the input value S[2], for each integer i of i=1, . . . , m in ascending order, wherein the hash value computation process computes the hash value H from a value S[1, m] and a value S[2, m], wherein the hash value computation program causes a processor of the hash value computation device to store intermediate values while computing in a memory of the hash value computation device, and a required memory size in the memory for outputting the ciphertext is k+n bits.

12. A non-transitory computer readable medium storing a hash value computation program to compute a hash value H of 2n bits using a block cipher E that takes as input a key K of k bits and a plaintext block P of n bits, which is a smaller number of bits than k bits, and outputs a ciphertext of n bits, the hash value computation program causing a computer to function as a hash value computation device to perform:

a function computation process of computing a function CF that processes the block cipher E a plurality of times sequentially on an input value M* of k−n bits, an input value S[1] of n bits, and an input value S[2] of n bits so as to compute an output value S'[1] of n bits and an output value S'[2] of n bits;

a hash value computation process of computing the hash value H from the output value S'[1] and the output value S'[2] computed by the function computation process; and a division process of dividing a value M' at every k−n bits to generate a value M[1], . . . , a value M[m], the value M' being a value obtained by padding a value M for which a hash value is computed so as to make the value M a multiple of k−n bits when the value M is not a multiple of k−n bits; and outputting the ciphertext of n bits, wherein the function computation process sets a value S[1, 0] as a fixed value IV[1] and sets a value S[2, 0] as a fixed value IV[2], and computes the output value S'[1] as a value S[1, i] and the output value S'[2] as a value S[2, i] by the function CF using a value M[i] as the input value M*, a value S[1, i-1] as the input value S[1], and a value S[2, i-1] as the input value S[2], for each integer i of i=1, . . . , m−1 in ascending order, and computes the output value S'[1] as a value S[1, m] and the output value S'[2] as a value S[2, m] by the function CF using a value M[m] as the input value M*, an exclusive OR of a value S[1, m-1] and a non-zero fixed value Const [1] as the input value S[1], and an exclusive OR of a value S[2, m-1] and a non-zero fixed value Const [2] as the input value S[2], wherein the hash value computation process computes the hash value H from the value S[1, m] and the value [2, m], wherein the hash value computation program causes a processor of the hash value computation device to store intermediate values while computing in a memory of the hash value computation device, and a required memory size in the memory for outputting the ciphertext is k+n bits.

\* \* \* \* \*